United States Patent
Deaver

[11] Patent Number: 5,809,098
[45] Date of Patent: Sep. 15, 1998

[54] METHOD FOR SEALING A STUB TUBE IN A NUCLEAR REACTOR

[75] Inventor: Gerald Alan Deaver, San Jose, Calif.

[73] Assignee: General Electric Company, Schenectady, N.Y.

[21] Appl. No.: 814,528

[22] Filed: Mar. 10, 1997

[51] Int. Cl.$^6$ .................................................. G21C 13/28
[52] U.S. Cl. .................... 376/203; 376/260; 376/286; 228/184; 277/314; 277/606
[58] Field of Search ...................... 376/203, 204, 376/260, 286, 287, 292, 293, 451; 29/890.031, 890.036; 228/184; 277/314, 606, 637

[56] References Cited

U.S. PATENT DOCUMENTS

| | | | |
|---|---|---|---|
| 4,480,841 | 11/1984 | Schukei et al. | 376/204 X |
| 5,006,300 | 4/1991 | Jonsson et al. | 376/203 |
| 5,209,894 | 5/1993 | Borrman et al. | 376/203 |
| 5,267,279 | 11/1993 | Saito et al. | 376/260 |

*Primary Examiner*—Charles T. Jordan
*Assistant Examiner*—Matthew J. Lattig
*Attorney, Agent, or Firm*—Armstrong, Teasdale, Schafly & Davis

[57] ABSTRACT

Methods for sealing cracks adjacent stub tube attachment welds in a reactor pressure vessel of a nuclear reactor are described. The reactor pressure vessel includes at least one stub tube through which a control rod housing extends. The control rod housing is attached to one end of the stub tube with an upper stub tube attachment weld. In one embodiment, a sidewall of a control rod drive housing is cut at a location below the upper stub tube attachment weld to form a weld passage in the control rod drive housing between the control rod drive housing and the stub tube. A weld is then formed in the weld passage so that it is in physical contact with both the stub tube and the control rod housing, and thus seals the control rod drive housing against the stub tube.

15 Claims, 2 Drawing Sheets

METHOD FOR SEALING A STUB TUBE IN A NUCLEAR REACTOR

FIELD OF THE INVENTION

This invention relates generally to boiling water nuclear reactors and more particularly, to sealing elongate hollow members such as control rod drive housings to a bottom head dome of a nuclear reactor pressure vessel of such reactors.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick.

The cylindrical shell is closed at its top end by a removable top head. The top head is removable so that components, such a fuel bundles, located in the RPV can be accessed. The RPV cylindrical shell is closed at its bottom end by a dome shaped bottom head assembly welded to the shell.

A plurality of openings are formed in the bottom head dome so that components, such as control rod drive assemblies, can extend within the RPV. Typically, a substantially cylindrical stub tube having a bore extending therethrough is welded to the bottom head dome and the tube bore aligns with an opening in the bottom head dome. The cylindrical stub tube typically is fabricated from a corrosion resistant material such as stainless steel or Ni-Cr-Fe.

With a control rod drive assembly, for example, the control rod drive housing, e.g., a tube, is inserted through the bottom head dome opening and stub tube bore, and the housing extends into the RPV. The control rod drive (CRD) housing is welded to the stub tube to maintain the housing in the desired position. The stub tube thus serves as a transition piece between the bottom head dome, which typically is fabricated from low alloy steel, and the CRD housing, which typically is fabricated from stainless steel.

Stress corrosion cracking (SCC) is a known phenomenon occurring adjacent stub tube welds connecting the bottom head dome to the stub tube and connecting the stub tube to the CRD housing. Particularly, the stub tube welds are subject to a variety of stresses associated with, for example, differences in thermal expansion, the operating pressure needed for the containment of the reactor cooling water, and other sources such as residual stresses from welding, cold working and other inhomogeneous metal treatments. Such stresses may, at times, cause cracks adjacent the stub tube welds or may even cause cracks in the weld materials.

If stress corrosion cracks adjacent stub tube welds are not sealed, such cracks cause potential leakage paths between the stub tube and the bottom head dome, and the stub tube and the CRD housing, respectively, which is undesirable. Accordingly, upon detection of any such cracks, it is desirable to re-seal the control rod drive housing, for example, to the bottom head dome.

One known method of re-sealing CRD housings within the bottom head dome includes completely replacing the stub tube and CRD housing. This method, however, is time consuming, tedious, and expensive. Particularly, the housing and associated stub tube are partially cut-off and the material remaining in the bottom head assembly is inspected to ensure that such material can be welded without damaging the bottom head. A weld build-up is then formed over the remaining material and machined so that a new stub tube can be welded to the weld build-up. Several weeks can be required to perform the replacement process of just one penetration tube. Moreover, much of the replacement work must be performed within the RPV, which requires completely unloading the RPV and is undesirable.

Another known method of re-sealing a CRD housing within the bottom head dome includes welding a sleeve to the CRD housing and the stub. This method, however, only addresses stress corrosion cracks adjacent the interface between the stub tube and the CRD housing. Moreover, installing the sleeve must be performed entirely within the RPV which, as explained above, is undesirable.

Yet another known method of re-sealing a CRD housing within the bottom head dome includes rolling the CRD housing into the bottom head dome. While this method is quicker than replacing the stub tube and CRD housing, rolling the CRD housing into the bottom head dome does not create as tight a seal as a weld between the CRD housing and the dome. Moreover, the rolled CRD housing may become separated from the bottom head dome after continued RPV operation, and must then be re-rolled. Re-rolling a CRD housing, however, often is neither desirable nor practical.

Still another known method of re-sealing a CRD housing within the bottom head dome includes removing and replacing a lower portion of the CRD housing within the bottom head dome. Particularly, a lower portion of the CRD housing is cut-off so that an upper portion of the CRD housing remains inserted in an opening in the bottom head dome and welded to the stub tube. The bottom head dome is then cleaned, and the lower end of the remaining CRD housing upper portion is machined so that a replacement bottom portion of CRD housing can be welded to the remaining upper portion. The replacement bottom portion of CRD housing similarly is machined so that it can be welded to the remaining upper portion. The replacement bottom portion of CRD housing is then inserted into the bottom head dome opening and positioned adjacent the remaining upper portion. The replacement bottom portion and the remaining upper portion of CRD housing are then bead welded to each other and to the bottom head dome. Bead welding the remaining upper portion to the bottom head dome has the undesirable effect of causing high stresses because of thermal growth mismatch between the CRD housing and the bottom head dome, which are fabricated from different materials. Such bead welding also has the undesirable potential effect of trapping water within a leakage path and in contact with the weld between the remaining upper portion and the bottom head dome.

It would be desirable, therefore, to provide a method for sealing a CRD housing within the bottom head dome which can be more easily and quickly performed than known sealing methods. It further would be desirable to provide such a method which reduces stresses caused by thermal growth mismatches between the CRD housing and the bottom head dome.

SUMMARY OF THE INVENTION

These and other objects may be attained by a method which, in one embodiment, facilitates re-sealing a substantially hollow control rod drive housing within a reactor pressure vessel of a nuclear reactor more quickly and easily than known sealing methods. The reactor pressure vessel includes a bottom head having at least one opening extending therethrough, a substantially hollow stub tube, and a control rod drive housing. A lower portion of the stub tube is welded to the bottom head so that a bore extending through the stub tube is substantially aligned with the bottom head opening. An upper portion of the stub tube is welded to the control rod drive housing so that the control rod drive housing extends through and is secured within the bottom head opening and the stub tube bore.

In accordance with one embodiment of the present invention, the method facilitates re-sealing the control rod drive housing to the stub tube if any cracks develop proximate the upper stub tube weld. The method includes the steps of cutting the control rod drive housing at a location below the upper stub tube weld to form a weld passage in the control rod drive housing, and forming a weld in the weld passage to seal the control rod drive housing against the stub tube. Particularly, the control rod drive housing is cut so that the weld passage is in communication with the stub tube, and the weld is inserted into the weld passage so that it is in physical contact with both the stub tube and the control rod housing.

To seal the control rod drive housing to the bottom head, the method further comprises the steps of cutting and removing a lower portion of the control rod drive housing, positioning a replacement lower portion adjacent a remaining portion of the control rod drive housing, and securing the replacement lower portion to the bottom head dome without welding the new lower portion to the bottom head dome. Specifically, the replacement lower portion is secured to a sidewall of the bottom head opening with an interference fit. The replacement lower portion then also is welded to the remaining portion of the control rod drive housing.

The above-described method seals a stub tube to a control rod drive housing more easily and quickly than known sealing methods. Such method also seals a stub tube to a bottom head dome more easily and quickly than known sealing methods. In addition, such method is believed to reduce stresses caused by thermal growth mismatches between the control rod drive housing and bottom head.

DETAILED DESCRIPTION OF THE DRAWINGS

Figure 1:
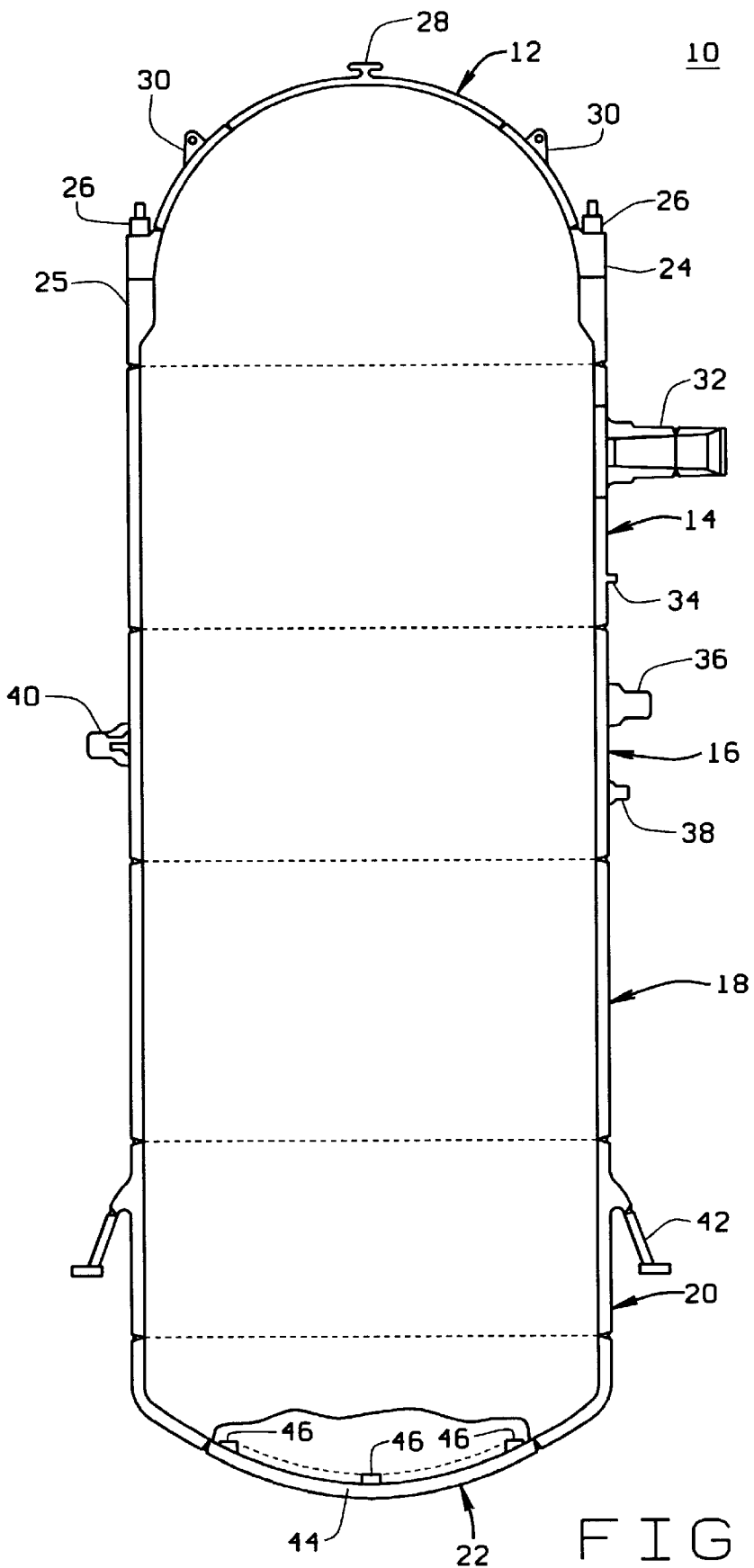
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. First shell course 14 includes a vessel flange 25. Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Fourth shell course 20 includes a support skirt 42 welded thereto. Support skirt 42 is utilized to support RPV 10 within the reactor housing (not shown).

Bottom head assembly 22 includes a bottom head dome 44 having a plurality of stub tubes 46 welded thereto. Stub tubes 46 are substantially cylindrical and each stub tube 46 has a bore (not shown in FIG. 1) extending therethrough. The bore of each stub tube 46 is aligned with an opening (not shown in FIG. 1) in bottom head dome 44. Components such as control rod drives, incore instruments, pressure instrument nozzles, and drain nozzles extend through such bottom head dome openings and stub tube bores and penetrate into RPV 10.

FIG. 1 is provided primarily for illustrative purposes to show a typical bottom head assembly 22. The present invention, as described below, can be used in many RPV configurations other than RPV 10.

Figure 2:
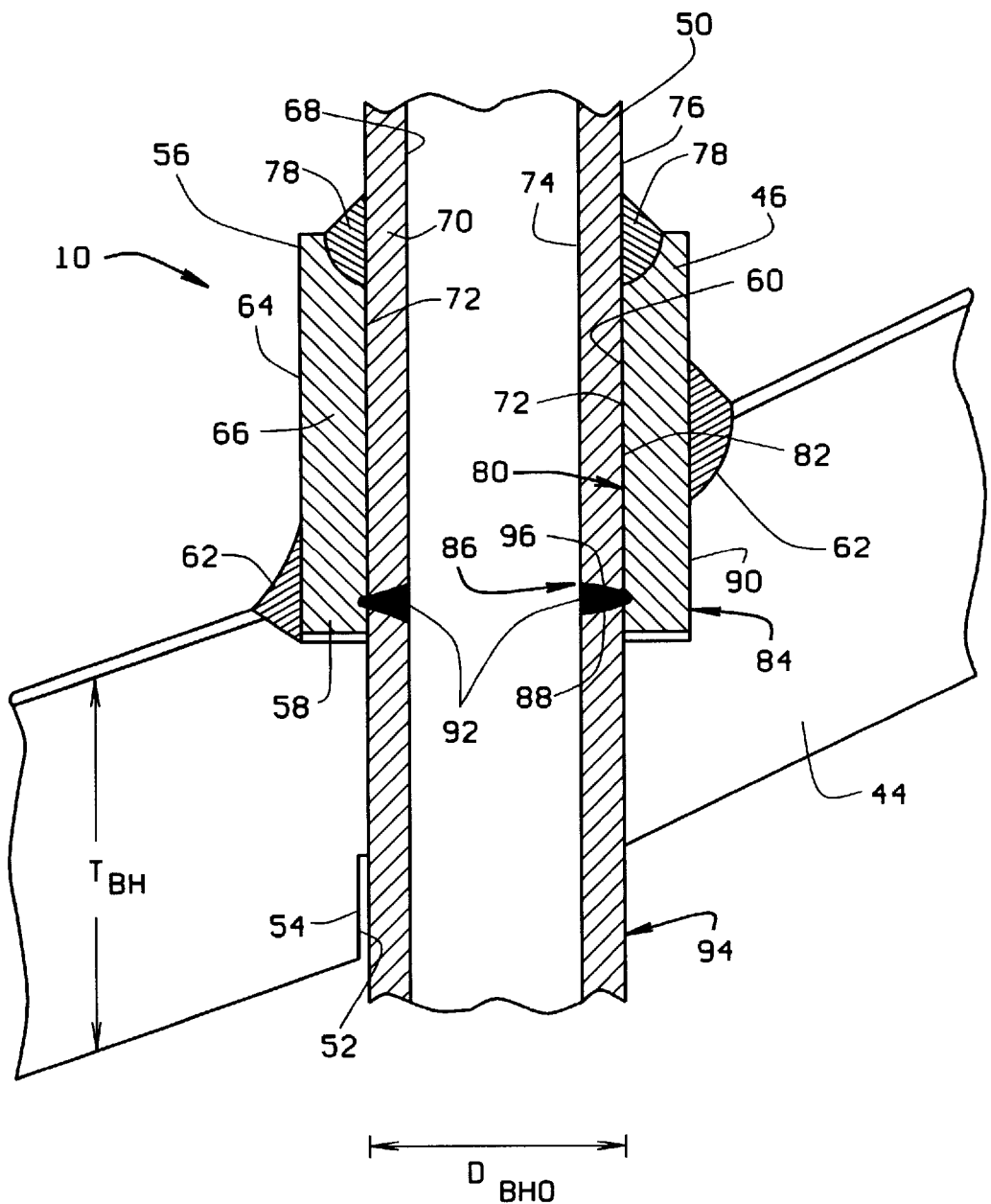
FIG. 2 is a partial cross-section view of a control rod drive housing, a stub tube, and a bottom head of a pressure reactor vessel wherein the control rod drive housing is sealed to the stub tube in accordance with one embodiment of the present invention.

FIG. 2 is a partial cross-section view of a control rod drive housing 50, one stub tube 46, and bottom head dome 44 of RPV 10 wherein control rod drive housing 50 is sealed to stub tube 46 in accordance with one embodiment of the present invention. As shown more clearly, bottom head dome 44 has a thickness $T_{BH}$, and includes a substantially cylindrical opening 52 therein defined by a sidewall 54. Stub tube 46 includes a first end 56 and a second end 58, and a stub tube bore 60 extends between first and second ends 56 and 58. Stub tube 46 is positioned adjacent bottom head opening 52 so that stub tube bore 60 is substantially aligned with bottom head opening 52. Stub tube 46 is secured to bottom head dome 44 with a lower stub attachment weld 62. Particularly, an outer surface 64 of stub tube sidewall 66 proximate second end 58 is welded to bottom head dome 44 with lower stub tube attachment weld 62.

Control rod drive housing 50 includes a first end (not shown) a second end (not shown) and a bore 68 extending between the first and second ends. Particularly, control rod drive housing 50 has a substantially hollow cylindrical geometric shape including a sidewall 70 having an outer surface 72 and an inner surface 74 which defines bore 68. Control rod drive housing 50 is positioned so that it extends through bottom head opening 52 and stub tube bore 60. An upper portion 76 of control rod drive housing 50 is secured to stub tube 46 with an upper stub tube attachment weld 78 so that control rod drive housing is substantially concentrically and fixedly secured within stub tube 46. As explained above, the positioning and welding of control rod drive housing 50 within stub tube 46 and bottom head dome 44 is well known. Furthermore, bottom head 44 is fabricated from low alloy steel, and stub tube 46 and control rod housing 50 are fabricated from a compatible corrosion resistant materials such as stainless steel or Ni-Cr-Fe.

Stress corrosion cracks sometimes occur adjacent upper stub tube attachment weld 78 or lower stub tube attachment weld 62. If such a crack occurs adjacent upper weld 78, an annulus leakage path 80 is formed between an inner surface 82 of stub tube sidewall 66 and outer surface 72 of control rod drive housing 50. Similarly, if such a crack occurs adjacent lower weld 62, an annulus leakage path 84 is formed between outer surface 72 of control rod drive housing 50 and sidewall 54 of bottom head opening 52.

To seal annulus leakage path 80 in accordance with one embodiment of the present invention, control rod drive housing 50 is cut at location 86 below upper stub tube attachment weld 78. Particularly, control drive housing 50 is cut to form a weld passage 88 through sidewall 70 of housing to sidewall 66 of stub tube 46. A portion of stub tube sidewall 66 also is cut to form a weld channel 90 within stub tube sidewall 66 adjacent to and aligned with weld passage 88. Weld passage 88 and weld channel 90 may be cut, for example, with known CRD housing cutting devices.

A weld 92 is then formed in weld passage 88 and into weld channel 90 so that weld 92 is in physical contact with both stub tube 46 and control rod drive housing 50. Weld 92 may be formed in weld passage 88 and in weld channel 90 in accordance with known welding techniques. In addition, weld 92 may be a corrosion resistant material, such as stainless steel or Ni-Cr-Fe, which is substantially compatible to both stub tube 46 and control rod drive housing 50. Accordingly, weld 92 substantially seals control rod drive housing 50 against stub tube 46, and thus seals annulus leakage path 80.

To seal annulus leakage path 84, a lower portion 94 of control rod drive housing 50 is cut and removed from bottom head opening 52. Particularly, control rod drive housing 50 is cut at a location 86 below upper stub tube attachment weld 78. A lower portion 94 of control rod drive housing 50 is separated and removed from upper portion 76 and bottom head opening 52 so that only upper portion 76 extends within stub tube 46. Sidewall 54 of bottom head opening 52 is then machined and honed in accordance with known methods so that bottom head opening 52 is substantially cylindrical with a diameter $D_{BHO}$. A replacement lower portion of control rod drive housing (not shown in FIG. 2) is then positioned within honed bottom head opening 52 so that an upper end of the replacement lower portion is substantially proximate to and aligned with a lower end 96 of remaining upper portion 76 adjacent location 86. The replacement lower portion is then secured to sidewall 54 of bottom head opening 52 with an interference fit.

More specifically, the replacement lower portion is substantially cylindrical and includes a first end, a second end, and a bore extending between the two ends. A sidewall of the replacement lower portion includes an inner surface which defines the replacement lower portion bore and an outer surface. The outer surface defines an outer diameter of the replacement portion, and such outer diameter is at least the same as bottom head opening diameter $D_{BHO}$. Prior to positioning the replacement lower portion within bottom head opening 52, an inner diameter of the replacement lower portion, i.e., the inner surface of the replacement portion sidewall, is cooled with liquid nitrogen, for example, so that such inner diameter contracts. The replacement portion then is positioned within bottom head opening 52 so that the replacement portion bore is substantially aligned with remaining upper portion 76 of control rod drive housing bore 68. After positioning the replacement lower portion within bottom head opening 52, and when the liquid nitrogen evaporates, the inner diameter expands to seal the replacement lower portion against sidewall 54 of bottom head opening 52. Since the replacement portion outer diameter is at least the same as bottom head opening diameter $D_{BHO}$, the replacement portion is sealed against bottom head opening sidewall 54 with an interference fit.

After the replacement portion is sealed against bottom head opening sidewall 54, weld 92 is formed in weld passage 88 and into weld channel 90 so that weld 92 is in physical contact with both stub tube 46 and upper portion 76 of control rod drive housing 50. Accordingly, the replacement portion is secured to stub tube 46 and upper portion 76 of control rod drive housing 50 with a weld attachment, and is secured to bottom head 44 with an interference fit, thus substantially sealing annulus leakage path 84.

To further seal between the replacement lower portion against sidewall 54 of bottom head opening 52, hydraulic pressure is applied to the replacement lower portion. Particularly, a hydraulic device is inserted through the replacement lower portion bore and exerts a radially outward hydraulic pressure on the replacement lower portion sidewall to create a uniform contact seal between the sidewall of the replacement portion and bottom head opening sidewall 54.

In accordance with one embodiment of the present invention, the replacement lower portion is fabricated from a material having a thermal coefficient of expansion more compatible with bottom head dome 44 than stainless steel. For example, the replacement lower portion may be fabricated from a material such as XM-19 which has higher strength properties than stainless steel and a coefficient of thermal expansion which is more compatible to the low alloy steel bottom head than stainless steel. The replacement lower portion may, of course, be fabricated from other materials.

The above-described method facilitates repairing stress corrosion cracks adjacent the upper stub tube weld and the lower stub tube weld more quickly and easily than known methods. In addition, such repairs may be substantially completed from below the bottom head dome, and significantly reduce stresses typically caused by thermal growth mismatches between the CRD housing and the bottom head dome.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, while the method was described in reference to a control rod drive housing, such method also may be used to reseal an incore monitor housing or other elongate hollow member within a stub tube and bottom head dome. Accordingly, the spirit and scope of the invention are to be limited only by the terms of the appended claims.

What is claimed is:

1. A method for sealing an elongate hollow member within a reactor pressure vessel of a nuclear reactor, the reactor pressure vessel including a bottom head dome, a stub tube, and the elongate hollow member, the bottom head dome having at least one opening therein, the stub tube having a first end, a second end, and a bore extending between the first and second ends, the stub tube welded to the bottom head dome adjacent the second end with a lower stub tube attachment weld so that the stub tube bore and the bottom head dome opening are substantially aligned, the elongate hollow member having a first end, a second end, and a bore extending between the first and second ends, the elongate member extending through the stub tube bore and secured to the stub tube adjacent the stub tube first end with an upper stub tube attachment weld, said method comprising the steps of:

cutting the elongate member at a location below the upper stub tube weld to form a weld passage in the elongate member; and forming a weld in the weld passage.

2. A method in accordance with claim 1 further comprising the step of cutting the stub tube to form a weld channel substantially adjacent to and aligned with the weld passage.

3. A method in accordance with claim 1 further comprising the steps of:

removing a lower portion of the elongate member;

replacing the removed lower portion with a replacement hollow portion; and securing the replacement hollow portion to the bottom head dome with an interference fit.

4. A method in accordance with claim 3 further comprising the step of securing the replacement hollow portion to a remaining upper portion of the elongate member with a weld attachment.

5. A method in accordance with claim 3 wherein the replacement hollow portion has an inner diameter, and wherein said method further comprises the step of cooling the inner diameter of the replacement hollow portion.

6. A method in accordance with claim 5 wherein cooling the inner diameter of the replacement hollow portion comprises the step of applying liquid nitrogen to the inner diameter of the replacement portion.

7. A method in accordance with claim 3 wherein securing the replacement hollow portion to the bottom head dome comprises the step of radially outwardly expanding the replacement hollow portion.

8. A method in accordance with claim 7 wherein radially outwardly expanding the replacement hollow portion comprises the step of applying hydraulic pressure to the replacement hollow portion.

9. A method in accordance with claim 8 wherein the replacement hollow portion has two ends and a bore extending between the two ends, and wherein the step of applying hydraulic pressure to the replacement hollow portion comprises the step of inserting a hydraulic device in the replacement hollow portion bore.

10. A sealed elongate hollow member secured to a reactor pressure vessel of a nuclear reactor, the reactor pressure vessel including a bottom head dome, a stub tube, and the elongate hollow member, the bottom head dome having at least one opening therein, the stub tube having a first end, a second end, and a bore extending between the first and second ends, the stub tube welded to the bottom head dome adjacent the second end with a lower stub tube attachment weld so that the stub tube bore and the bottom head dome opening are substantially aligned, said elongate hollow member comprising a first end, a second end, and a bore extending between said first and second ends, said elongate member extending through the stub tube bore and secured to the stub tube adjacent the stub tube first end with an upper stub tube attachment weld, and wherein said elongate member also is welded to said stub tube at a location below said upper stub tube attachment weld.

11. A sealed elongate hollow member in accordance with claim 10 wherein said elongate hollow member comprises a weld passage between said first end and said second end, said weld passage adjacent said stub tube between the stub tube first and second ends.

12. A sealed elongate hollow member in accordance with claim 11 wherein a weld is inserted in said weld passage.

13. A sealed elongate hollow member in accordance with claim 10 wherein said elongate hollow member includes an upper portion and a lower portion, and wherein said lower portion is secured to said bottom head dome with an interference fit.

14. A sealed elongate hollow member in accordance with claim 13 wherein said lower portion is secured to said upper portion with a weld attachment.

15. A sealed elongate hollow member in accordance with claim 13 wherein said lower portion is not welded to said bottom head dome.

* * * * *